(12) United States Patent
Pelliconi et al.

(10) Patent No.: US 7,848,472 B2
(45) Date of Patent: Dec. 7, 2010

(54) SYNCHRONIZATION METHOD OF DATA INTERCHANGE OF A COMMUNICATION NETWORK, AND CORRESPONDING CIRCUIT AND ARCHITECTURE

(75) Inventors: Roberto Pelliconi, Imola (IT); Christian Gazzina, Manerbio (IT); Michele Borgatti, Finale Emilia (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 1472 days.

(21) Appl. No.: 10/772,590

(22) Filed: Feb. 4, 2004

(65) Prior Publication Data
US 2005/0088288 A1   Apr. 28, 2005

(30) Foreign Application Priority Data
Feb. 6, 2003   (EP) .................................. 03425069

(51) Int. Cl.
*H04L 7/00* (2006.01)
(52) U.S. Cl. ...................... 375/354; 375/356; 375/357; 375/257; 370/389; 370/462; 370/458; 709/209; 709/225; 709/222; 709/235; 340/286.02
(58) Field of Classification Search ................ 375/211, 375/219, 365, 354, 257, 356, 357; 365/174; 708/403; 713/400, 300; 370/216, 389, 462, 370/458; 455/502; 709/209, 225, 222, 235; 340/286.02
See application file for complete search history.

(56) References Cited

U.S. PATENT DOCUMENTS 5,398,317 A   3/1995  Nugent

| 5,901,146 | A  | * | 5/1999  | Upp .......................... 370/389 |
|---|---|---|---|---|
| 6,536,025 | B2 | * | 3/2003  | Kennedy et al. ............... 716/6 |
| 6,778,435 | B1 | * | 8/2004  | Han et al. .................... 365/174 |
| 6,965,558 | B1 | * | 11/2005 | Hann ......................... 370/216 |
| 7,047,028 | B2 | * | 5/2006  | Cagenius ..................... 455/502 |
| 2001/0010063 | A1 | * | 7/2001 | Hirose et al. ................ 710/240 |
| 2004/0044919 | A1 | * | 3/2004 | Dabral ....................... 713/400 |
| 2004/0150453 | A1 | * | 8/2004 | Farjad-rad .................. 327/307 |
| 2005/0069041 | A1 | * | 3/2005 | Lincoln ...................... 375/257 |

FOREIGN PATENT DOCUMENTS

EP   0429787   6/1991

OTHER PUBLICATIONS

Mizuno, et al., "Elastic interconnects: repeater-inserted long wiring capable of compressing and decompressing data", 2001 IEEE International Solid-State Circuits Conference, Feb. 5, 2001, pp. 346-464, XP010536296.
Dally, "Interconnect-Limited VLSI Architecture", Proceedings of the IEEE 1999 International Interconnect Technology Conference (Cat. No. 99EX247), May 26, 1999, pp. 15-57, XP002279459.
European Search Report, EP 03 42 5069, dated Jun. 9, 2004.

* cited by examiner

*Primary Examiner*—Eva Y Puente
(74) *Attorney, Agent, or Firm*—Gardere Wynne Sewell LLP

(57) ABSTRACT

A semiconductor substrate integrated electronic circuit includes a transmitter block and a receiver block connected through a communication network (4). A data signal having a transmission period is generated on a first line that is received by the receiver block. A congestion signal is generated on a second line from the receiver block to the transmitter block when a congestion event of the receiver block occurs in order to interrupt the data signal transmission. A synchro signal is generated on a third line starting from the transmitter block, this synchro signal indicating to the receiver block that the data signal comprises a new datum. The congestion signal also interrupts the synchro signal transmission when a congestion event of the receiver block occurs.

14 Claims, 2 Drawing Sheets

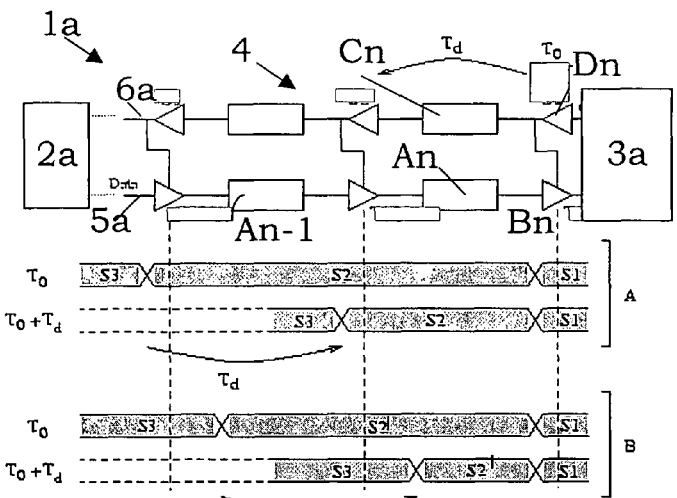
Fig. 1 (Prior Art)
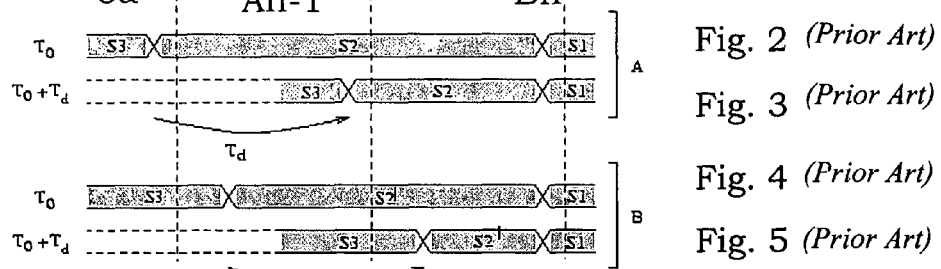
Fig. 2 (Prior Art)
Fig. 3 (Prior Art)
Fig. 4 (Prior Art)
Fig. 5 (Prior Art)
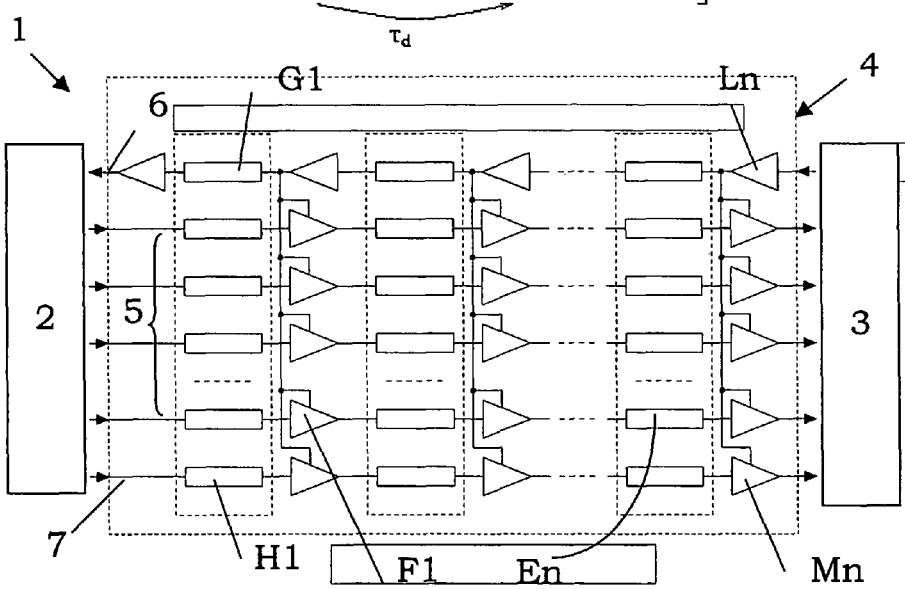
Fig. 6
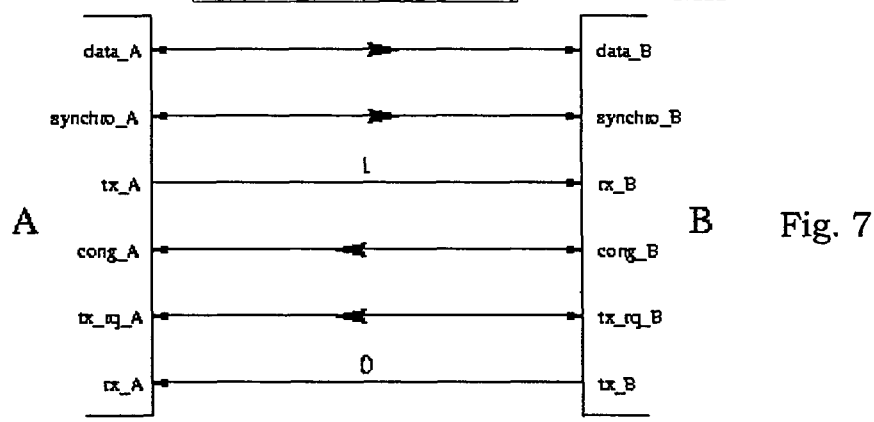
Fig. 7

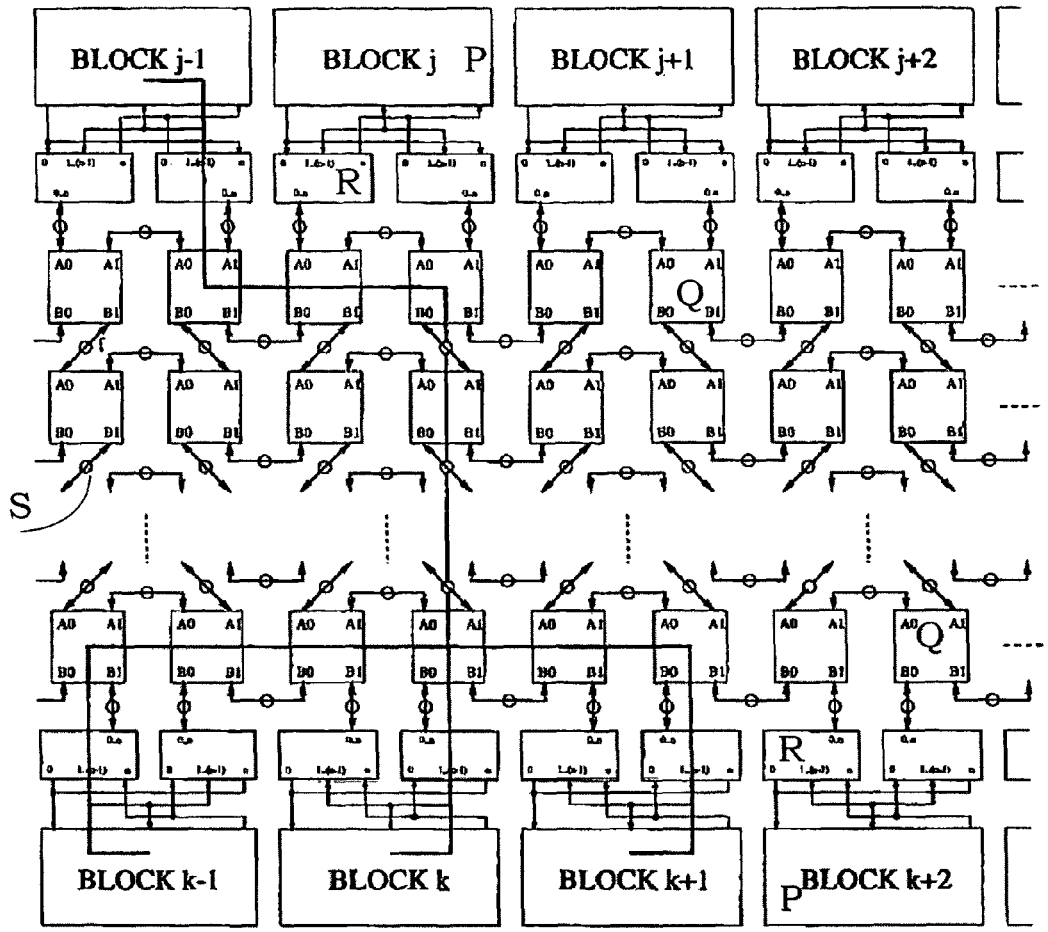
FIG.8
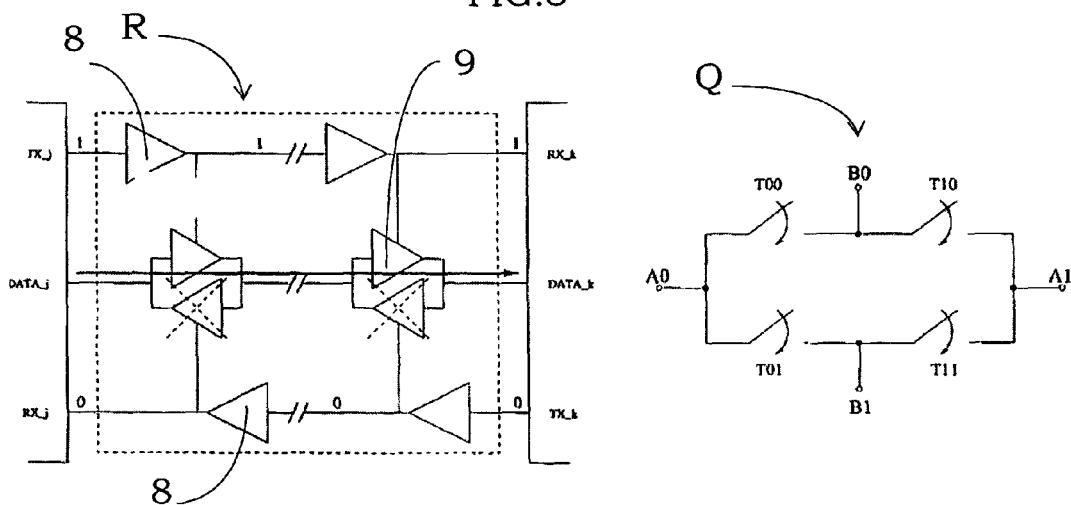
FIG. 9
FIG. 10

SYNCHRONIZATION METHOD OF DATA INTERCHANGE OF A COMMUNICATION NETWORK, AND CORRESPONDING CIRCUIT AND ARCHITECTURE

PRIORITY CLAIM

The present application claims priority from European Patent Application No. 03425069.6 filed Feb. 6, 2003, the disclosure of which is hereby incorporated by reference.

BACKGROUND OF THE INVENTION

1. Technical Field of the Invention

The present invention relates to a synchronization method for data interchange in a communication network.

2. Description of Related Art

It is well known that in very complex electronic systems integrated on a same chip, like for example multiprocessor circuits with embedded memories or SoC (System on circuit chip) circuits, particular attention must be drawn to the delays introduced in the signal transmission inside the interconnection networks.

In fact the different devices must be capable of communicating with each other and this communication is very critical when these devices are not synchronized with each other, i.e., driven by a same clock signal. Obviously, if the communication does not occur correctly, the operation of the whole circuit is not reliable.

Another requirement which is particularly felt in recent years is to manufacture circuits, and thus communication networks, which are easily reconfigurable.

A first prior art solution to meet this requirement of making communication networks reconfigurable, provides that the circuit system, wherein these communication networks are inserted, is equipped with a memory storing a predetermined series of communication network configurations which can be recovered, when needed, to reconfigure the circuit system and the communication network.

Although advantageous under many aspects, this solution has several drawbacks. Particularly, some time is required to reconfigure the circuit system, for example in the microsecond range, but this time can be even higher depending on the amount of data to be read from the memory where configurations are stored.

The structural and functional needs in the art increasingly require that the least amount of time possible be used to reconfigure the system.

As is known, in order to improve the data transmission speed in slow or long communication networks, wherein the datum takes some time to pass from one point to the other in the network, and to make these transmissions reliable, communication protocols are used.

A first known protocol for data transmission is known as wave pipeling. As it is known, a data transmission system comprises a transmitter, a receiver and a series of transmission lines. In this kind of protocol the transmitter transmits data at a higher frequency with respect to the communication network delay. However in this kind of protocol when the transmission must be interrupted, possibly because of receiver congestion, data are irretrievably lost.

It is therefore necessary for the receiver to inform the transmitter, by sending a signal, that it is not capable of correctly receiving and so of interrupting the transmission. If the receiver and the transmitter were near to each other and signal transmission were fast, sending a signal to stop the transmitter transmission would be enough to correctly stop the transmission by using conventional protocols. However some time, called latency time, lapses from when the receiver sends a signal which is correctly recognized by the transmitter. The data which is transmitted in the time interval which lapses between the sending of the stop signal and the real data interruption could be lost.

A known solution to solve this drawback is referred to as elastic interconnection.

Particularly with reference to FIG. 1, an integrated device 1a comprises a transmitter 2a, a receiver 3a being interconnected through a communication network 4. This communication network comprises one or more data signal lines 5a being parallel to each other.

The communication network 4a is split in a plurality of stages A1, ..., An. A tristate repeater B1, ..., Bn is inserted between each stage A1, ..., An. These repeaters B1, ..., Bn are capable of sampling and maintaining the voltage level of the data signal line 5a being inputted therein.

The communication network 4 is also provided with a further signal line 6a wherein a signal called congestion signal passes. The congestion signal is a unidirectional signal transmitted by the receiver 3a to the transmitter 2a. The congestion signal line 6a is split in corresponding stages C1, ..., Cn interconnected to each other through repeaters D1, ..., Dn. Each repeater C1, ..., Cn+1 of the congestion signal line 6a drives a corresponding tristate repeater B1, ..., Bn.

When the receiver 3a is not capable of receiving data it sends the congestion signal. This signal, by spreading on the line 6a, enables the tristate repeaters B1, ..., Bn of the data signal lines. Therefore, if a stage An−1 comprises a charge, associated to a predetermined logic level, when the two tristate repeaters associated to this stage are open, this charge is stored in the stage An−1.

Supposing that each data S2 during the transmission occupies two consecutive stages at time $\tau_o$, wherein the congestion signal is sent as shown in FIG. 2. When the congestion signal arrives, after the congestion signal has crossed the stage Cn at time $\tau_o+\tau_d$, the datum S2 is compressed in a single stage An as shown in FIG. 3 where $\tau_d$ is the delay of each single stage An (also referred to as the unitary delay). When the congestion signal is changed once again from the transmitter 2a, tristate repeaters B1, ..., Bn are disabled and the data flow continues to flow in the communication network decompressing the datum.

Although matching the aim, this solution has some drawbacks.

In fact, if it happens that the datum S2' occupies less than two successive stages, as shown in FIG. 4, it may happen that the datum in the compression step is compressed together with a part of the following datum S3 making the datum S2' recovery by the receiver 3a impossible.

For the correct operation of this known protocol, the datum length must occupy exactly two stages. In other words, the time length of the datum transmitted must be exactly twice the unitary delay $\tau_d$ of each single stage. Therefore, for the transmission to occur correctly, a perfect synchronization must exist between the transmitter 2a and the receiver 3a, i.e., the data transmission frequency must be the same as the data reception one for the correct recovery of data which have been stored and compressed in the communication network.

The technical problem underlying the present invention is to provide a communication protocol, having such functional and structural characteristics as to allow the receiver and transmitter to operate at different frequencies overcoming the reliability and speed limitations and drawbacks which still limit prior art communication protocols.

A further technical problem is to provide a communication network wherein the unitary delay, $\tau_d$, of each single stage is minimized.

SUMMARY OF THE INVENTION

The present invention solves the foregoing and other problems by associating a further signal in the communication network of the already existing data and congestion signals in order to allow the receiver to read the data signal even if the data signal frequency is not known a priori, and even after this data signal has been temporarily interrupted during transmission.

In order to minimize the unitary delay $\tau_d$ of each single stage in which the communication network is split, a communication network of the present invention comprises a plurality of elementary blocks which are all equal to each other.

The present invention relates to a method for synchronizing the data interchange in a semiconductor substrate integrated electronic circuit comprising a transmitter block and a receiver block connected through a communication network, comprising the steps of:
  generating a data signal having a transmission period on a first line from said transmitter block which must be received by the receiver block;
  generating on a second line a congestion signal from the receiver block to the transmitter block when a receiver block congestion event occurs in order to interrupt the transmission of said data signal; and
  associating a further signal in the communication network of the already existing data and congestion signals in order to allow the receiver to read the data signal even if the data signal frequency is not known a priori, and even after this data signal has been temporarily interrupted during transmission.

BRIEF DESCRIPTION OF THE DRAWINGS

A more complete understanding of the method and apparatus of the present invention may be acquired by reference to the following Detailed Description when taken in conjunction with the accompanying Drawings wherein:

FIG. 1 shows a schematic circuit of a semiconductor substrate integrated electronic device comprising a communication network according to the prior art;

FIGS. 2 and 3 show the time behavior of a first data signal through the communication network of FIG. 1;

FIGS. 4 and 5 show the time behavior of a second data signal through the communication network of FIG. 1;

FIG. 6 shows a schematic circuit of a semiconductor substrate integrated electronic device comprising a communication network according to the invention;

FIG. 7 shows the signals being interchanged in an alternative embodiment of the communication network according to the invention;

FIG. 8 shows an architecture of a semiconductor substrate integrated electronic device comprising, for example, a communication network according to the invention;

FIG. 9 shows a first detail implementing the architecture of FIG. 8; and

FIG. 10 shows a second detail implementing the architecture of FIG. 8.

DETAILED DESCRIPTION OF THE DRAWINGS

The invention relates particularly, but not exclusively, to a method for synchronizing the data interchange in a communication network and the following description is made with reference to this field of application for convenience of illustration only.

With reference to FIG. 6, an interconnection network which can be used with the protocol according to the invention is described.

The integrated device 1 comprises a transmitter 2 and a receiver 3 interconnected to each other through a communication network 4. This communication network 4 comprises one or more data signal lines 5 being parallel to each other. The communication network 4 is split in different stages E1, . . . , En. A tristate repeater F1, . . . , Fn is inserted between each stage E1, . . . , En belonging to the same line. These repeaters F1, . . . , Fn are capable of sampling and maintaining the voltage level of the data signal line being inputted therein.

The communication network 4 is provided with a further signal line 6 wherein a congestion signal passes. This congestion signal is a unidirectional signal transmitted from the receiver 3 to the transmitter 2.

According to the invention, the communication network 4 is also provided with a further signal line 7 wherein a "synchro" signal passes. This synchro signal is a unidirectional signal transmitted from the transmitter 2 to the receiver 3.

Both the congestion signal line 6 and the synchro signal line 7 are split in corresponding stages G1, . . . , Gn and H1, . . . , Hn. A repeater L1, . . . , Ln is inserted between each stage G1, . . . , Gn belonging to the congestion signal line 6 while a repeater M1, . . . , Mn is inserted between each stage H1, . . . , Hn belonging to the synchro signal line 7. Each tristate repeater F1, . . . , Fn is coupled to a corresponding repeater L1, . . . , Ln of the congestion signal line 6 and to a corresponding repeater M1, . . . , Mn of the synchro signal line 7.

The operation of the method for synchronizing the data interchange, also referred to as a protocol, according to the invention will now be described.

During the data signal transfer from the transmitter 2 to the receiver 3, the receiver sends a congestion signal whenever a congestion occurs at the receiver 3, i.e., that the receiver 3 is not capable of receiving the data signal correctly. As mentioned concerning the prior art, when a congestion event occurs, a congestion signal is emitted by the receiver, in response to which the data signal is stored and compressed along the data line.

According to an aspect of the invention, a synchro signal having the same direction as the data signal flux is inserted in the communication network. This synchro signal must be detectable by the receiver 3 and from the behavior thereof the receiver 3 must determine if the signal which is arriving is new or old. Particularly, when the synchro signal varies, the receiver 3 recognizes the arrival of a new data signal.

As mentioned, this synchro signal is transmitted together with the data signal associated thereto. Advantageously, the synchro signal is transmitted after the data signal has been sent in order to ensure that the data signal has already reached the receiver 2 when the synchro signal arrives. Therefore, the receiver 3, when the synchro signal arrives, is receiving the new data signal and it can read it correctly.

Advantageously, the synchro signal is sent at half the transmission of the data signal, i.e., the synchro signal is delayed by on-half period with respect to the data signal of the transmitter 2. It is thus important to emphasize that this synchro signal is not shared with the receiver 3 and the transmitter 2, but it is a signal which is sent together with the data signal and it only depends on the latter.

Due to the presence of the synchro signal the transmitter 2 can transmit the data signal at a different, generally lower, sampling frequency of the receiver 3. The receiver 3 reads and recovers the data signals sent by the transmitter 2 only simultaneously with the reception of the synchro signal. Therefore, wherein $T_{TR}$ is the transmitter synchro period and $T_{REC}$ is the receiver sampling period, and wherein $\tau_d$ the delay inserted in each stage S1, ..., Sn of the communication network, the following equations must be verified:

$$T_{TR} \geq 2\tau_d$$

$$T_{REC} \leq 2\tau_d \lfloor T_{TR}/2\tau_d \rfloor,$$

where the term $\lfloor T_{TR}/2\tau_d \rfloor$ is the lowest number of stages in which the signal can be stored. From these equations it can be understood that each data signal can have a time duration of at least two delays $\tau_d$, but it can be even longer.

Because the data signal time duration is not fixed a priori, the receiver 3 cannot know a priori the length of the datum transmitted. Thus, the receiver is not capable of estimating if the datum which is arriving thereto at a precise time is a new datum which must be sampled or if it is an old datum that has already been sampled (i.e., recovered). Therefore, in accordance with the protocol of the present invention, the synchro signal changes its state whenever new data are emitted by the transmitter.

In an advantageous embodiment of the invention, when the receiver detects the synchro signal transition it sets a flag indicating the arrival of a new datum. At the following change of the receiver synchro signal edge, data in the data signal line are read by the receiver and the flag indicating the arrival of a new datum is reset (if this flag is not reset, no other datum will be read or detected). As soon as new data are read, the valid signal is set and it remains in this state until the following edge of the receiver synchro signal.

It is worth noting that, thanks to the protocol according to the invention, it is no longer necessary to ensure that the synchro signal of the receiver 3 and of the transmitter 2 have the same phase. After all, the complete signal received by the receiver 3 is thus composed of the communication of the data signal and the synchro signal. Advantageously, the edges of these signals are separated at each time instant in order to allow the receiver to correctly recover the new data, independently from the speed changes of the single signals in the communication network.

In a particularly advantageous embodiment the transmitter transmission frequency is about half the double of the lowest elementary delay, i.e., the following equation must be verified:

$$T_{TR}/2 \geq 2\tau_d.$$

Moreover the protocol according to the invention can be advantageously used for bi-directional communication networks besides for unidirectional communication networks as described up to now. Particularly, the structure of a bi-directional device is similar to the structure of a unidirectional device already described. Clearly, the tristate repeaters or buffers F1, ..., Fn are of the bi-directional type. In this kind of network, advantageously with respect to the prior art bi-directional networks wherein the network direction is stored in configuration bits, the direction is defined by supplementary signals interconnecting the single stages E1, ..., En with each other.

For example, in the schematic view of FIG. 7, which shows the signals which are interchanged between two blocks, besides the data signal, the synchro signal and the congestion signal which can be used in both communication directions, two unidirectional signals are additionally shown which only determine the transmission direction of the communication network. These unidirectional signals are set after the transmitter has sent a request to the receiver indicating that it is going to start the transmission.

Particularly, the schematic view of FIG. 7 shows a series of signals which can be used in a bidirection communication network. When connecting a generic block A to a block B, the signal tx_A is connected with rx_B and tx_B with rx_A. The signals tx_A and tx_B are output signals, while rx_A and rx_B are input signals. These signals define the receiver block and the transmitter block. The transmitter block is characterized by the output signal being equal to a high logic value, while the receiver block is characterized by an output signal being equal to a low logic value. The definition of transmitter block and receiver block is set by the configuration state before the transmission, then it changes dynamically by using a transmission direction negotiation protocol. The values assigned to the signals tx_A and tx_B define the direction of all the other signals crossing the communication network: the data and synchro signals (both already used also in the unidirectional embodiment) are driven by the transmitter block, while the congestion signal (already used in the unidirectional embodiment) and the transmission request signals tx_rq are driven by the receiver block.

The signal direction definition is obtained by driving convenient signals to the tristate bi-directional buffer. The negotiation to define the direction is controlled by the transmission request signal tx_rq, driven by the receiver block. Whenever the receiver block wants to become transmitter block, it forces the signal tx_rq to a high logic value. When the transmitter block receives the request, it decides, according to the negotiation policy, when to give the control to the receiver block which forces the signal tx_ to a high logic value and becoming the receiver block. When the receiver block detects this event, it forces the signal tx_ to a high logic value and it becomes the transmitter block. Thereafter, the direction inversion becomes effective.

Advantageously, these signals tx_rx_ and tx_rq_ use some of the data lines. It is also possible that these signals use further dedicated lines.

As it can be understood from the previous description the protocol according to the invention will be more effective if it is implemented in an architecture comprising a plurality of blocks wherein the elementary delay d is minimized.

In the prior art, in order to connect two points of a same network, so-called crossbar multiplexers are commonly used. However, this solution is not optimized for long buses whereto a high number of gates is connected. It is thus advantageous to apply the protocol according to the invention in an architecture as the one shown in FIG. 8.

This architecture is a multilevel architecture comprising a first series of devices P which must communicate with each other, which are interconnected to each other through a plurality of elementary blocks Q. Devices P are connected to the elementary blocks Q through a second series of interface devices R. These elementary blocks Q are interconnected to each other through bi-directional buffer S. Advantageously elementary blocks Q are all equal in order to be easily manufactured and in order to enlarge the structure by increasing the block number with no need to redesign the whole structure itself.

As shown in FIG. 8 each device P is connected to two interface devices R, which receive the same signals from the device P. The only difference is the connection of the unidirectional signals indicating the transmission direction which are interchanged. The interchange is required to correctly connect the unidirectional signals between the different elementary blocks Q. As mentioned, the two unidirectional signals are required only for defining the data flow direction, since they indicate the configuration for the bi-directional repeaters (buffers) which must be correctly driven for a correct connectivity.

An example of interface devices R is shown in FIG. 9. This device comprises a plurality of lines TX_j, DATA_j, RX_j, which are split in several stages interconnected to each other through repeaters 8 and 9. Particularly, the lines TX_j, RX_j are unidirectional lines, therefore repeaters 8 are unidirectional, while DATA_j are bi-directional lines wherein repeaters 9 are bi-directional. Once the transmission direction is set, the transmission of repeaters 9 is disabled in the direction opposite to the data flow (as indicated by the dotted "X").

Moreover, each signal having direction OUT from an elementary block, i.e., outputting from the terminals A0 and B0, can be connected only to an input IN of another elementary block Q, i.e., inputting to the terminals A1, B1.

The elementary device is, for example, a crossbar comprising a multiplexer 2×2, in order to ensure some local parasitic capacities. FIG. 10 shows the scheme of such a multiplexer.

Two branches, which are parallel to each other, are inserted between the terminal A0 and the terminal A1. The first branch comprises a first series of switches T00, T10 while the second branch comprises a second series of switches T01, T11. The terminal B0 is thus taken between the common point between the switches T00, T10 and the terminal B1 is thus taken between the common point between the switches T01, T11.

As it can be noted, the connections between terminals A0-A1 and B0-B1 are not allowed by enabling only an elementary switching device, the implemented architecture being thus completely flexible in order to form the possible connections Ai-Bj.

An operation example is obtained by considering T00 on and the other ones off; the parasitic effects are caused by the left portion of T01 and T10, through interconnection wires and repeaters considered to be connected to the closed wires. The last two contributions to the parasitic capacities depend on the length of interconnection lines and on the repeater size, thus in order to reduce these parasitic effects it is necessary to manufacture compact structures.

A structure wherein the elementary switching devices are 2×2 multiplexers is thus manufactured, so that the interconnection lengths are the shortest possible.

Advantageously, the network communication direction is set between two adjacent elementary blocks Q by setting at least a signal which, between the two elementary blocks Q, identifies the transmission direction.

By using the protocol according to the invention in the directional architecture described a part of the signals DATA_j is used for the congestion signal and for the synchro signal, while elementary blocks Q implement the unitary stages of the communication network and bi-directional buffers S implement network repeaters.

In conclusion, the protocol according to the invention allows variable length data to be transmitted. Moreover, by splitting the communication network in several smaller stages it is possible to control more easily the elementary delay $\tau_d$. In fact the smallest is the elementary delay the highest is the speed of the whole communication network.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for synchronizing a data interchange in a semiconductor substrate integrated electronic circuit comprising a transmitter block and a receiver block connected through a communication network, comprising:

generating a data signal having a transmission period on a first line, the data signal sent at a first instant from said transmitter block to be received by the receiver block;

generating on a second line a congestion signal sent from the receiver block to the transmitter block when a congestion event of the receiver block occurs in order to interrupt the transmission of said data signal; and generating on a third line a synchro signal sent at a second instant from said transmitter block, this synchro signal indicating to the receiver block that the data signal on the first line comprises a new datum, wherein the congestion signal interrupts also the transmission of said synchro signal when a congestion event of the receiver block occurs, and wherein the second instant for sending said synchro signal for communication over the third line is delayed with respect to the first instant for sending the data signal for communication over the first line.

2. The method for synchronizing the data interchange according to claim 1, wherein said synchro signal is delayed by a half transmission period with respect to the data signal.

3. A method for synchronizing a data interchange in a semiconductor substrate integrated electronic circuit comprising a transmitter block and a receiver block connected through a communication network, comprising:

generating a data signal having a transmission period on a first line that from said transmitter block must be received by the receiver block;

generating on a second line a congestion signal from the receiver block to the transmitter block when a congestion event of the receiver block occurs in order to interrupt the transmission of said data signal;

generating on a third line a synchro signal starting from said transmitter block, this synchro signal indicating to the receiver block that the data signal comprises a new datum, and in that the congestion signal interrupts also the transmission of said synchro signal when a congestion event of the receiver block occurs; and reading, by the receiver block, of the data signal with a different sampling period than the transmission period of the transmitter block, wherein sampling by the receiver block for reading in accordance with the different sampling period occurs simultaneously with reception by the receiver block of the synchro signal.

4. A method for synchronizing a data interchange in a semiconductor substrate integrated electronic circuit comprising a transmitter block and a receiver block connected through a communication network, comprising:

generating a data signal having a transmission period on a first line that from said transmitter block must be received by the receiver block;

generating on a second line a congestion signal from the receiver block to the transmitter block when a congestion event of the receiver block occurs in order to interrupt the transmission of said data signal;

generating on a third line a synchro signal starting from said transmitter block, this synchro signal indicating to the receiver block that the data signal comprises a new datum, and in that the congestion signal interrupts also the transmission of said synchro signal when a congestion event of the receiver block occurs; and reading, by the receiver block, of the data signal with a different sampling period than the transmission period of the transmitter block;

wherein the different sampling period is a shorter sampling period than the transmission period of the transmitter block and sampling in accordance with that shorter sampling period occurs simultaneously with reception by the receiver block of the synchro signal.

5. A method for synchronizing a data interchange in a semiconductor substrate integrated electronic circuit comprising a transmitter block and a receiver block connected through a communication network, comprising:

generating a data signal having a transmission period on a first line that from said transmitter block must be received by the receiver block;

generating on a second line a congestion signal from the receiver block to the transmitter block when a congestion event of the receiver block occurs in order to interrupt the transmission of said data signal; and generating on a third line a synchro signal starting from said transmitter block, this synchro signal indicating to the receiver block that the data signal comprises a new datum, and in that the congestion signal interrupts also the transmission of said synchro signal when a congestion event of the receiver block occurs, wherein said first, second and third lines are split in corresponding stages, each stage being separated through a corresponding repeater, the repeaters of the first and third lines being of the tristate type and being driven by the repeater of the second line when a congestion event occurs at the receiver block so that the data signal and the synchro signal are stored in the stages of the first and third lines; and wherein said stages have an elementary delay which must be shorter than half the transmission period.

6. An integrated electronic circuit being integrated on a semiconductor substrate comprising a transmitter block and a receiver block connected through a communication network, said communication network comprising a first line for a data signal, a second line for a congestion signal, and a third line for a synchro signal, wherein said first, second and third lines are split in corresponding stages, each stage being separated through a corresponding repeater, the repeaters of the first and third lines being of the tristate type whose tristate condition is controlled by an output of the repeater of the second line when a congestion event of the receiver block occurs so that the data signal and the synchro signal are stored in the stages of the first and second lines.

7. The integrated electronic circuit of claim 6 wherein said signal line comprises a couple of further lines for a couple of unidirectional signals indicating the transmission direction between said transmitter block and said receiver block, a negotiation to define the transmission direction being controlled by a further transmission request signal driven by the receiver block.

8. A communication protocol method, comprising:

transmitting from a transmitting entity to a receiving entity a data signal and a synchronization signal, the synchronization signal indicating to the receiving entity that data in the transmitted data signal is new data; and inhibiting transmission of the synchronization signal by the transmitting entity in response to an indication received from the receiving entity of the existence of a congestion condition at the receiving entity, wherein the data signal is communicated on a first communication line and the synchronization signal is communicated on a second communication line; and wherein transmitting from the transmitting entity comprises delaying between a first instant for sending the data signal over the first communications line and a second instant for sending the synchronization signal over the second communication line.

9. The protocol method as in claim 8, wherein the indication of the existence of a congestion condition at the receiving entity is received over a third communication line.

10. The protocol method as in claim 8 further including inhibiting transmission of the data signal in response to the indication received from the receiving entity of the existence of a congestion condition at the receiving entity.

11. A communication system, comprising:

a first communication block;

a second communication block;

a communication network interconnecting the first and second communication blocks, the communication network comprising:

a first communication line for carrying a data signal;

a second communication line for carrying a congestion signal; and a third communication line for carrying a synchronization signal, wherein the synchronization signal is active whenever data in the data signal on the first communication line is new data and inactive whenever the congestion signal on the second communication line is active, wherein the first, second and third communication lines are each split into corresponding stages, further comprising:

a repeater device separating consecutive ones of the stages; and wherein the repeaters of the first and third communications lines are of the tristate type whose tristate condition is controlled by an output of the repeater of the second communication line in response to the congestion signal being active so that the data signal and the synchronization signal are stored in stages of the first and second communications lines.

12. A communication system, comprising:

a first communication block;

a second communication block;

a communication network interconnecting the first and second communication blocks, the communication network comprising:

a first communication line for carrying a data signal;

a second communication line for carrying a congestion signal; and a third communication line for carrying a synchronization signal, wherein the synchronization signal is active whenever data in the data signal on the first communication line is new data and inactive whenever the congestion signal on the second communication line is active;

wherein the first, second and third communication lines are bi-directional, further including:

a transmit signal line; and a receive signal line;

wherein the transmit and receive signal lines interconnect the first and second communication blocks, and the first and second communication blocks set a logic state of the transmit signal line and receive signal line which specify, for the bi-directional first communication line, which of the first and second communication blocks is a transmitter of the data signal and which of the first and second communication blocks is a receiver of the data signal.

13. The system of claim 12, further including a request signal line that interconnects the first and second communication blocks, and a control signal thereon used to negotiate which of the first and second communication blocks is to be transmitter/receiver.

14. A communication system, comprising:
a first communication block;
a second communication block;
a communication network interconnecting the first and second communication blocks, the communication network comprising:
a first communication line for carrying a data signal;
a second communication line for carrying a congestion signal; and
a third communication line for carrying a synchronization signal, wherein the synchronization signal is active whenever data in the data signal on the first communication line is new data and inactive whenever the congestion signal on the second communication line is active;
wherein an instant for sending of the active synchronization signal transmission over the third communication line is delayed after an instant for sending of the data signal transmission on the first communication line.

* * * * *

UNITED STATES PATENT AND TRADEMARK OFFICE
CERTIFICATE OF CORRECTION

PATENT NO. : 7,848,472 B2  Page 1 of 1
APPLICATION NO. : 10/772590
DATED : December 7, 2010
INVENTOR(S) : Roberto Pelliconi et al.

It is certified that error appears in the above-identified patent and that said Letters Patent is hereby corrected as shown below:

In the Specification:

At column 6, line number 43, please replace [delay d] with -- delay $\tau_d$ --.

Signed and Sealed this
Twenty-third Day of August, 2011

David J. Kappos
*Director of the United States Patent and Trademark Office*